United States Patent [19]

Braun

[11] Patent Number: 4,749,398
[45] Date of Patent: Jun. 7, 1988

[54] APPARATUS FOR MAKING SPHERICAL PARTICLES

[75] Inventor: Rudolf K. Braun, Wharton, N.J.

[73] Assignee: Potters Industries, Inc., Hasbrouck Heights, N.J.

[21] Appl. No.: 915,006

[22] Filed: Oct. 3, 1986

Related U.S. Application Data

[62] Division of Ser. No. 763,293, Aug. 7, 1985, Pat. No. 4,643,753.

[51] Int. Cl.$^4$ .............................................. C03B 19/10
[52] U.S. Cl. ...................................... 65/142; 65/21.3; 65/23; 65/60.6; 425/90
[58] Field of Search .................. 65/21.2, 21.3, 22, 23, 65/21.4, 60.6, 141, 142; 425/90; 501/34; 264/7, 15; 34/57 A

[56] References Cited

U.S. PATENT DOCUMENTS

| | | | |
|---|---|---|---|
| 2,460,977 | 2/1949 | Davis et al. | 65/142 X |
| 2,461,011 | 2/1949 | Taylor et al. | 65/142 X |
| 2,684,840 | 7/1954 | Behme et al. | 264/15 X |
| 2,833,622 | 5/1958 | Roberts et al. | 264/15 X |
| 3,615,187 | 10/1971 | Suzukawa et al. | 264/15 X |
| 4,475,936 | 10/1984 | Aston et al. | 65/21.3 X |
| 4,530,290 | 7/1985 | Comparto | 34/57 A X |
| 4,535,065 | 8/1985 | Klein et al. | 34/57 A X |
| 4,640,023 | 2/1987 | Mori et al. | 34/57 A |

Primary Examiner—Robert L. Lindsay
Attorney, Agent, or Firm—Lee C. Robinson, Jr.

[57] ABSTRACT

An apparatus for spheridizing irregularly shaped minute particles, and the spheres produced thereby, in which a thin carbonaceous coating is applied to the particles in a unique manner, and in a preferred embodiment the particles are then advanced through successive fluidizing beds. The first bed has an inert atmosphere and is maintained at an elevated temperature sufficiently high to allow surface tension to shape the particles into spherical form while in a fluidized condition in the first bed. The spherical particles are then advanced through successive additional beds where they are cooled to an intermediate temperature sufficient to solidify the particles, are subjected to an oxidizing atmosphere which completely removes the coating, and are then further cooled while being maintained in a fluidized condition. The inert gaseous atmosphere within the first bed is continuously withdrawn and recycled through the system.

5 Claims, 4 Drawing Sheets

APPARATUS FOR MAKING SPHERICAL PARTICLES

This application is a division of application Ser. No. 763,293 filed Aug. 7, 1985, now U.S. Pat. No. 4,643,753 granted Feb. 17, 1987.

BACKGROUND OF THE INVENTION

This invention relates to a novel sphere making apparatus and more particularly to such an apparatus for making spheres from minute particles of glass or other sphere forming material and to the spheres produced thereby.

Glass beads and other spherical particles manufactured in accordance with the invention have numerous industrial and commercial applications. In many cases the beads are used to provide a reflecting surface, such as in lane marking for highways, for road and advertising signs, motion picture screens, etc. Other uses for the beads include applications in which their reflecting properties are of little moment, as in cases in which the beads are employed as fillers for plastic materials, for impact treatment and peening of metal surfaces, or for various electrical uses. The diameter of the beads may vary widely and illustratively ranges from about 6.0 millimeters down to about 1 micron.

Various processes and apparatus have been employed heretofore to manufacture glass spheres. As an illustration, it often has been common practice to introduce irregularly shaped glass particles into a vertically disposed draft tube which is open at its upper end and is provided with a well-distributed gas flame adjacent its lower end. The particles are carried upwardly by the combustion gases into an expansion chamber or stack mounted above the draft tube. During their upward movement, the particles become soft and are shaped by surface tension into a substantially spherical configuration to form glass beads. For a more detailed discussion of representative bead manufacturing systems of this type, reference may be had, for example, to U.S. Pat. No. 2,334,578 granted Nov. 16, 1943, to Rudolf H. Potters, U.S. Pat. No. 2,619,776 granted Dec. 2, 1952 to Rudolf H. Potters, U.S. Pat. No. 2,945,326 granted July 19, 1960 to Thomas K. Wood and to U.S. Pat. Nos. 3,560,185 and 3,560,186 granted Feb. 1, 1971 to Arthur G. Nylander.

In other cases glass spheres have been produced directly from a stream of molten glass as shown, for example, in U.S. Pat. No. 3,279,905 granted Oct. 18, 1966 to Thomas K. Wood et al. Still further sphere making processes of the type previously employed include the use of rotary kiln. In these latter processes the crushed glass particles customarily are coated with a resin or other binder and a material such as graphite to provide a protective coating and/or matrix around each particle as the spheres are formed. Processes of this latter type are disclosed in U.S. Pat. No. 3,597,177 issued Aug. 3, 1971 to Charles Davidoff and U.S. Pat. No. 2,461,011 issued Feb. 8, 1949 to N. W. Taylor et al.

The prior processes and apparatus employed in the manufacture of spherical particles such as glass beads have exhibited certain disadvantages. As an illustration, the overall thermal efficiency of many such prior systems was comparatively low, with the result that the manufacturing cost of the beads was excessive. In addition, and this has been of special moment in processes and apparatus which used a vertical draft tube, the thermal efficiency was further impaired because of the need to use a portion of the available energy for the vertical transport of the particles, and the temperature gradient within the tube resulted in the production of spheres which occasionally exhibited a lack of roundness and had other defects. It was also necessary to carefully control the population density of the particles in order to minimize the incidence of collisions between particles which detracted from the quality of the product. The equipment previously employed to produce glass spheres was large in size and had additional disadvantages which further detracted from the efficient and economical manufacture of the spheres on a continuous large volume basis.

Other prior processes and apparatus, such as those utilizing rotary kilns and similar equipment, had the disadvantage that the coating materials employed required either a binder for the protective coating or a matrix of substantial mass that needed to be heated in addition to the particles. A further disadvantage of processes and apparatus of this latter type was the fact that the coating material had to be removed in a costly mechanical process like washing, etc. to achieve a coating free product.

SUMMARY

One general object of this invention, therefore, is to provide a novel and economical apparatus for producing glass beads or other spherical particles.

More specifically, it is an object of this invention to provide such apparatus in which the available heat is utilized in a more efficient and less expensive manner than has been attainable heretofor.

Another object of this invention is to provide an apparatus for producing spherical particles in which the resulting particles exhibit extremely good uniformity and roundness characteristics.

A further object of the invention is to provide a particle producing apparatus in which an extremely fine and uniform coating is applied to the particles without the use of binders or matrices.

A still further object of the invention is to provide a particle producing process and apparatus of the character indicated wherein the coating is removed to produce optically clear particles without washing or mechanically removing the coating.

Still another object of the invention is to provide a new and improved system for manufacturing glass beads that is economical and thoroughly reliable in operation.

In one illustrative embodiment of the invention, a multiplicity of crushed glass particles is introduced into a fluidizing bed. An inert gas or other fluidizing material is directed into the bed to suspend the particles in a fluidized condition, and the particles are heated to an elevated temperature sufficiently high to allow surface tension to shape the particles into spherical form. The particles are thereafter cooled while continuing their fluidization for a period of time sufficient to cause the setting of the particles in the form of spheres.

The use of a fluidizing bed to produce or otherwise treat the particles comprises a particularly advantageous feature of a number of preferred embodiments of the invention. The bed serves to confine the particles within an area that is much smaller than that of most of the sphere making systems employed commercially heretofore, with the result that the amount of heat loss during the spheoridization of the particles is substantially reduced. In addition, the more even heat distribution within the bed enables the production of spheres that have improved roundness and size characteristics.

In accordance with another feature of the invention, in several advantageous embodiments, prior to the time they reach their softening temperature the particles are provided with a thin coating of protective material. In cases in which the particles come in contact with one another during their formation into spheres, the coating serves to prevent the particles from agglomerating or otherwise sticking together. The coating preferably comprises an oxidizable carbon which adheres to the particles even in vertical draft tube or rotary kiln type systems.

In accordance with a further feature of several good embodiments of the invention, after spheoridization the coated particles are exposed to an oxidizing atmosphere. The particles are maintained in the atmosphere for a period of time sufficient to burn off or otherwise oxidize and remove the coating in a manner such that the resulting spheres are optically clear and have good retroreflective properties.

The present invention, as well as further objects and features thereof, will be understood more clearly and fully from the following description of a preferred embodiment, when read with reference to the accompanying drawings.

DESCRIPTION OF CERTAIN PREFERRED EMBODIMENTS

Figure 1:
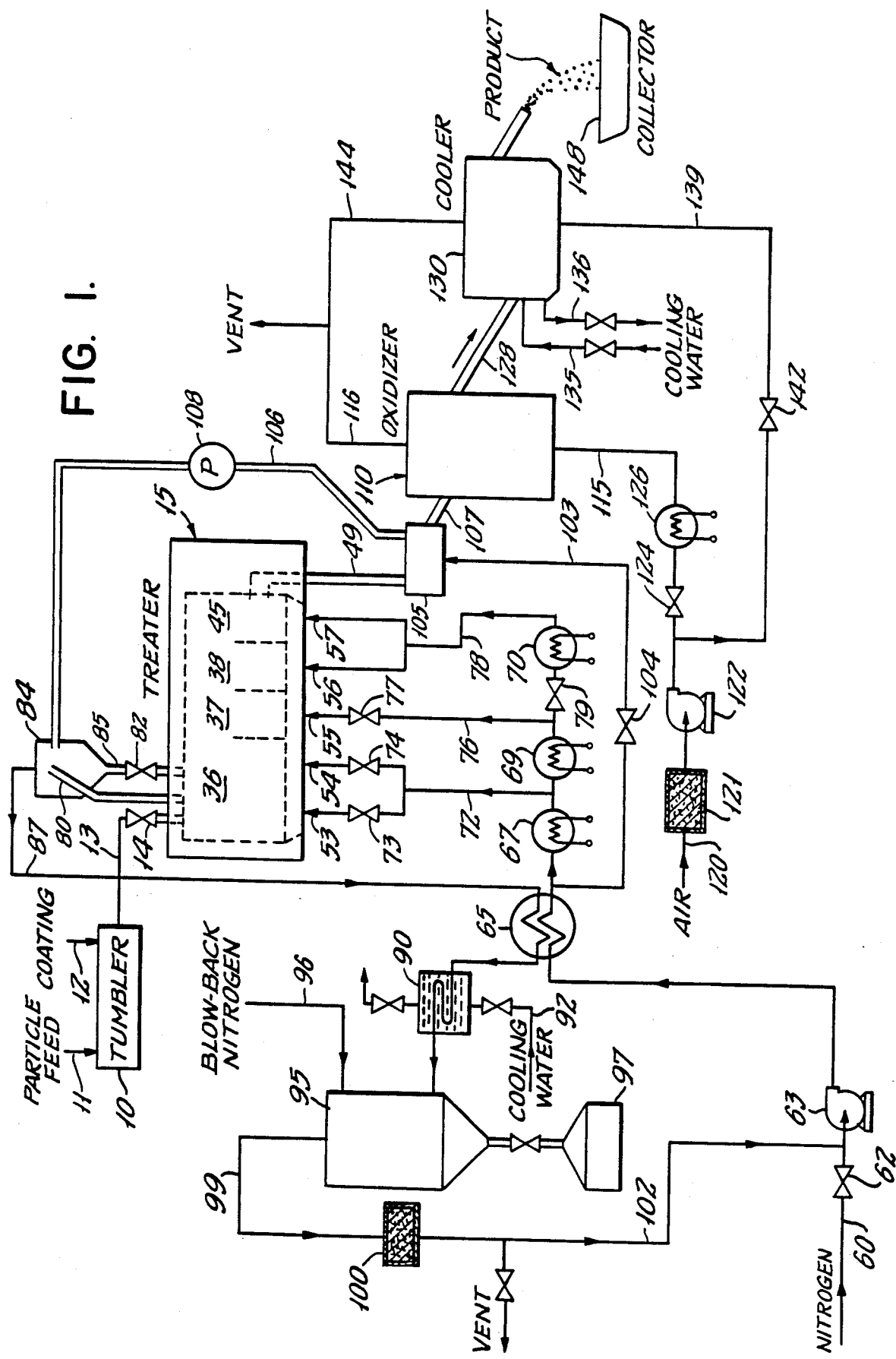
FIG. 1 is a schematic diagram of an apparatus for producing glass beads in accordance with one illustrative embodiment of the invention.

Referring to FIG. 1 of the drawings, there is shown a process and apparatus for manufacturing glass beads from minute crushed glass particles. In the illustrated embodiment the crushed particles comprise a conventional soda-lime-silicate glass, but the process and apparatus may be employed with substantially equal facility to produce spheres from other types of glass, from plastics or from substantially any other particulate material that has the property of becoming spherical through surface tension or other means upon the application of heat. The process and apparatus illustrated in the drawings have particular utility in the mass production of glass beads through the use of one or more fluidizing beds. As will be explained in more detail in the ensuing discussion, however, certain of the features of the invention also are applicable to the manufacture of the beads by means of vertical draft tubes, rotary kilns or other types of bead-making systems.

In the process and apparatus of FIG. 1 a multiplicity of crushed glass particles are continuously fed to a tumbler 10 through an infeed conduit 11. The tumbler 10 is of conventional construction and also includes an infeed conduit 12 for receiving a suitable coating material. This coating advantageously comprises an oxidizable adherent carbonaceous material, of a type to be described in more detail hereinafter, and is thoroughly mixed with the glass particles within the tumbler 10 to provide an extremely thin but complete coating on each particle. No binders or matrices are added to the mixture, but the extremely fine particle size and adherent properties of the coating material contribute to the realization of a smooth and uniform coating around each particle.

Figure 3:
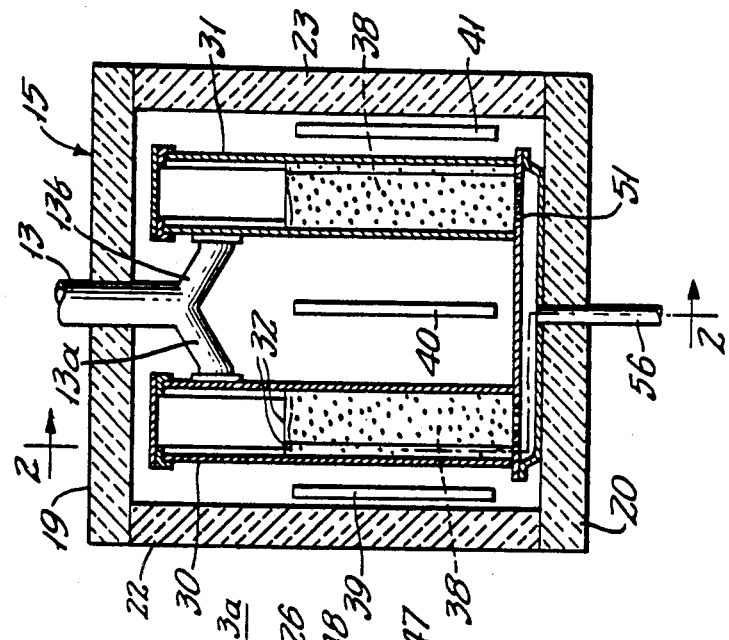
FIG. 3 is a transverse vertical sectional view taken along the line 3—3 in FIG. 2.
Figure 2:
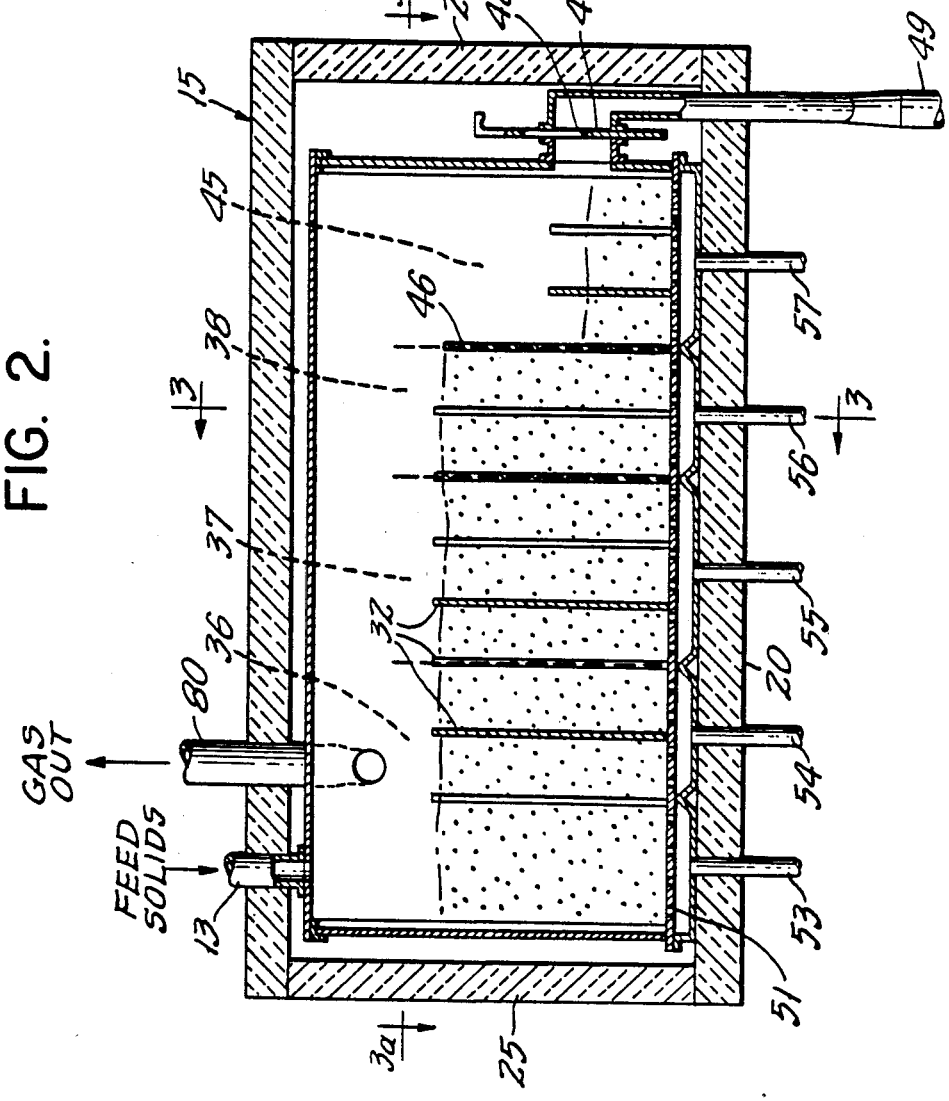
FIG. 2 is a longitudinal vertical sectional view taken along the line 2—2 in FIG. 3 and illustrating a fluidizing bed and associated components utilized in the apparatus of FIG. 1.

The thus coated glass particles are led from the tumbler 10 through a conduit 13 and a valve 14 to a sphere forming enclosure in the form of a fluidizing bed 15. As best shown in FIGS. 2 and 3, the conduit 13 enters the fluidizing bed 15 adjacent the left or infeed end of the bed's upper wall 19. The bed 15 also includes a lower wall 20, longitudinal side walls 22 and 23, and transverse side walls 25 and 26, which are each fabricated from a refractory heat-insulating material. These walls form a longitudinally extending rectangular enclosure for the various internal components of the bed.

Figure 3A:
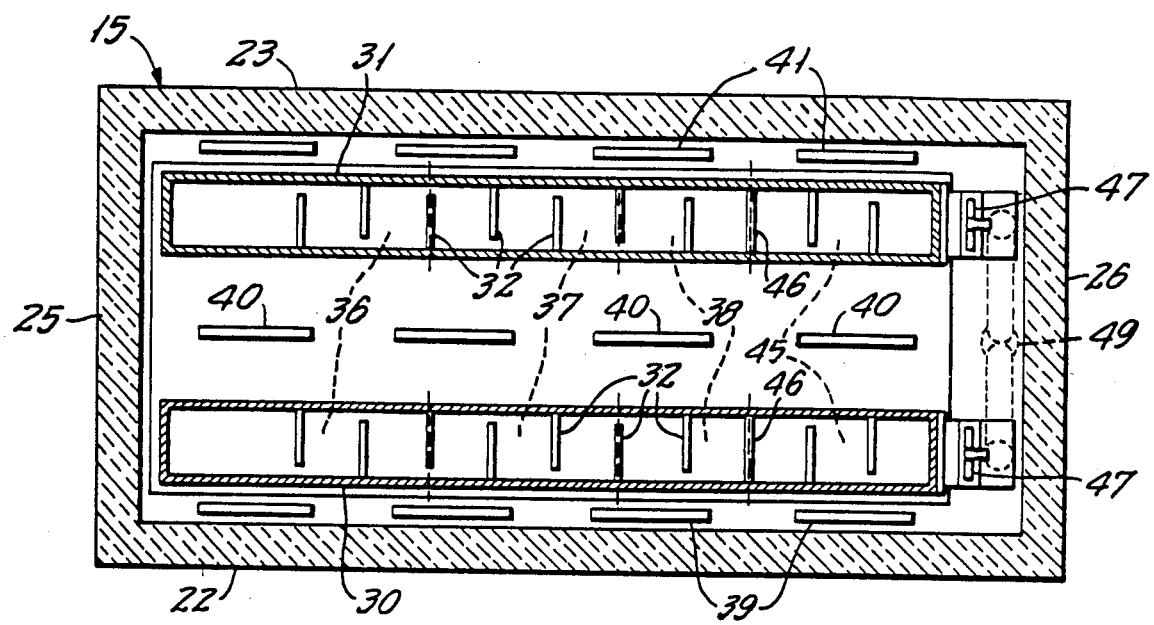
FIG. 3a is a horizontal sectional view taken along the line 3a—3a in FIG. 2.

Mounted within the fluidizing bed 15 are two long and comparatively narrow channels 30 and 31. The channels 30 and 31 are arranged in side by side parallel relationship with each other in position to receive the coated glass particles from the particle conduit 13. The conduit 13 is provided at its lower end with a Y connection to form branch conduits 13a and 13b which communicate with the channels 30 and 31, respectively. The channels 30 and 31 are each provided with a series of baffles 32 (FIG. 3a). The baffles 32 are in the form of vertical plates which lie in planes transverse to the longitudinal direction of the channels and extend alternately from opposite sides of each channel to provide a sinuous path for the particles moving along the channel.

Heating zones 36, 37 and 38 are provided within the fluidizing bed 15. The temperature of these zones is controlled in part by heating elements 39, 40 and 41 within the bed 15. As best seen in FIGS. 3 and 3a, the heating elements 39 and 41 are located adjacent the respective longitudinal side walls 22 and 23 of the bed 15, while the heating element 40 is centrally located midway between the two channels 30 and 31. The bed 15 additionally includes an outfeed zone 45 located at the downstream or discharge end of the bed. The zone 45 is separated from the zone 38 by a vertically disposed weir plate 46 which extends transversely across each of the channels 30 and 31.

An adjustable weir plate 47 is interposed between the outfeed zone 45 and the transverse wall 26 at the discharge end of the fluidizing bed 15. The weir plate 47 is provided with a central opening defined by a horizontal ledge 48 and is slidably positioned for vertical movement within a discharge conduit 49 which extends through the lower wall 20 of the bed 15. This discharge conduit communicates with the channels 30 and 31 of the bed 15 by means of a suitably Y connection (not visible in the drawings). The weir plate 47 may be moved either upwardly or downwardly with respect to the conduit 49 to vary the position of the ledge 48 within the conduit.

A perforated bottom plate 51 is supported within the fluidizing bed 15 a short distance above the bottom wall 20. Five gas inlet conduits 53, 54, 55, 56 and 57 extend through the bottom wall 20 of the bed 15 and are spaced along the longitudinal center of the bed. These inlet conduits are arranged to admit fluidizing gas into the space between the wall 26 and the bottom plate 51 and then through the perforations in the bottom plate to the two interior channels 30 and 31.

Referring again to FIG. 1 of the drawings, the fluidizing gas is introduced into the system through an inlet conduit 60. The gas advantageously comprises nitrogen or other gas which is sufficiently inert that it will not react with either the coating material or the particles being spheoridized at the temperatures used in the system. The incoming gas is directed through an inlet valve 62 and a blower 63 to a heat exchanger 65. From the heat exchanger 65 fluidizing gas is admitted to a preheater 67 and then to successive heaters 69 and 70.

A branch conduit 72 is connected to the inlet conduit 60 between the heaters 67 and 69. The conduit 72 leads to two valves 73 and 74 in parallel relationship with each other, and these valves in turn are connected to the inlet conduits 53 and 54. A second branch conduit 76 is connected to the conduit 60 between the heaters 69 and 70. The conduit 76 leads through a valve 77 to the gas inlet conduit 55. The remaining gas inlet conduits 56 and 57 are connected to the conduit 60 by a branch conduit 78 on the downstream side of the heater 70. The flow of fluidizing gas through the heater 70 and the branch conduit 78 is controlled by a valve 79.

The arrangement is such that the fluidizing gas within the conduit 60 is preheated by the heat exchanger 65 and the preheater 67, and a portion of the preheated gas is then introduced into the zone 36 of the fluidizing bed 15 through the branch conduit 72 and the inlet conduits 53 and 54. Another portion of the preheated fluidizing gas is further heated by the heater 69 and is introduced into the zone 37 of the bed 15 through the branch conduit 76 and the inlet conduit 55, while a third portion of the preheated fluidizing gas is further heated by the heater 70 and is introduced into the zones 38 and 45 of the bed through the branch conduit 78 and the inlet conduits 56 and 57.

The fluidizing bed 15 is provided with a gas outlet conduit 80 for continuously withdrawing inert gas from adjacent the upstream end of the upper wall 19 (FIG. 2). The outlet conduit 80 is connected to a cyclone separator 84 which serves to separate dust and other particulate material from the hot inert gas coming from the fluidizing bed 15. The particulate material is returned to the bed 15 through a valve 82 and a return conduit 85, while the withdrawn gas is led through a conduit 87 to the heat exchanger 65 where it is used to partially preheat the fresh inert gas within the inlet conduit 60. From the heat exchanger 65 the withdrawn gas proceeds to a cooling unit 90 which is supplied with cooling water through a conduit 92. The cooled gas then enters a bag filter 95 having a blow-back nitrogen supply conduit 96 and a dust bin 97 which collects residual particulate material within the gas. A conduit 99 directs the gas from the bag filter 95 to a further filter 100, and this latter filter is connected by a conduit 102 to the inlet conduit 60 between the valve 62 and the blower 63. This thus cooled and filtered gas is admixed with the fresh fluidizing gas in the conduit 60 and is recycled through the system.

A conduit 103 is connected to the fluidizing gas conduit 60 by a valve 104. The conduit 103 joins the conduit 60 between the heat exchanger 65 and the preheater 67 and is used to supply fluidizing gas to an intermediate fluidizing bed 105 which receives the coated glass spheres from the discharge conduit 49. The fluidizing bed 105 serves as a sealer bed to isolate the inert atmosphere within the bed 15, and it also effects a partial cooling of the spheres. To insure the free flow of the particles falling through the discharge conduit 49 into the bed 105, the bed is provided with an outlet conduit 106 which leads to a pump 108 and then to the separator 84. The pump 108 continuously withdraws inert gas from the bed 105 and thereby prevents the build-up of excessive pressure within the bed.

Figure 4:
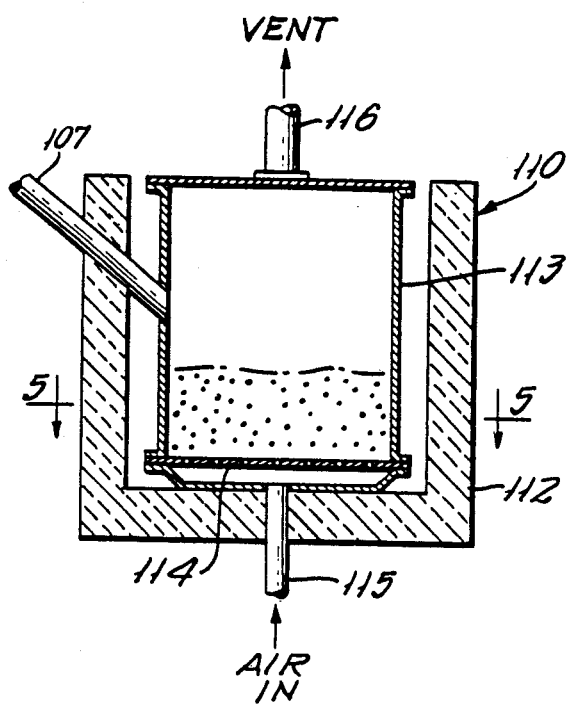
FIG. 4 is a vertical sectional view of another fluidizing bed utilized in the apparatus of FIG. 1.
Figure 5:
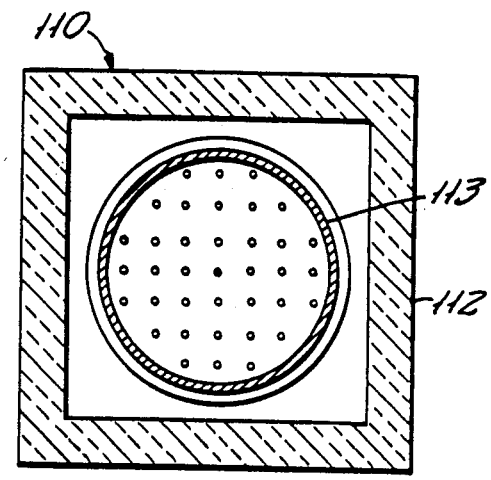
FIG. 5 is a horizontal sectional view taken along the line 5—5 in FIG. 4.

From the sealer and intermediate cooler bed 105 the coated spheres proceed through a discharge conduit 107 to an oxidizer fluidizing bed 110. As best shown in FIGS. 4 and 5, the oxidizer bed 110 includes a casing 112 of refractory heat-insulating material which encloses a cylindrical shell 113. The shell 113 is provided with a perforated bottom plate 114 in spaced relationship with the bottom wall of the casing 112. An air inlet conduit 115 extends through the bottom wall of the casing to admit fluidizing gas into the space between the bottom wall and the plate 114 and then through the perforations in the plate to maintain the coated spheres within the shell 113 in a fluidized condition in an oxidizing atmosphere. The shell 113 provides an enclosure for the coated spheres and includes a vent conduit 116 which extends upwardly from the top of the shell.

The fluidizing bed 110 is supplied with air or other oxidizing gas from an inlet conduit 120 (FIG. 1). The incoming gas proceeds through an air filter 121 and a blower 122 to a valve 124 and then through a heater 126 to the inlet conduit 115.

Figure 6:
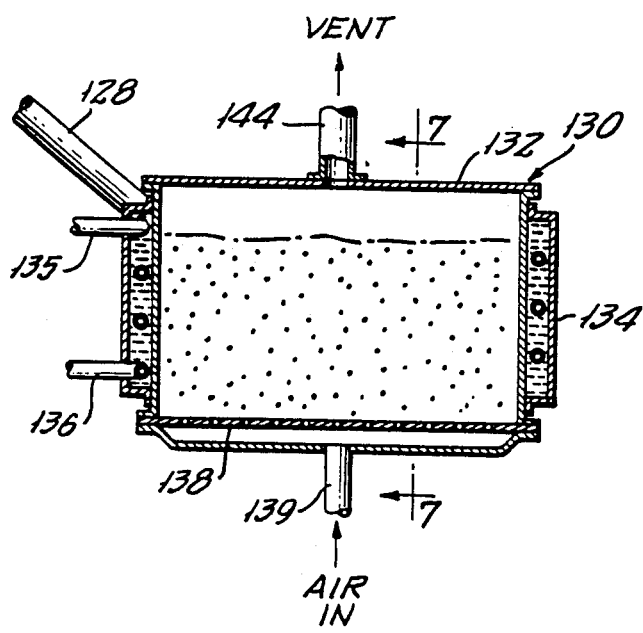
FIG. 6 is a longitudinal vertical sectional view of a third fluidizing bed utilized in the apparatus of FIG. 1.
Figure 7:
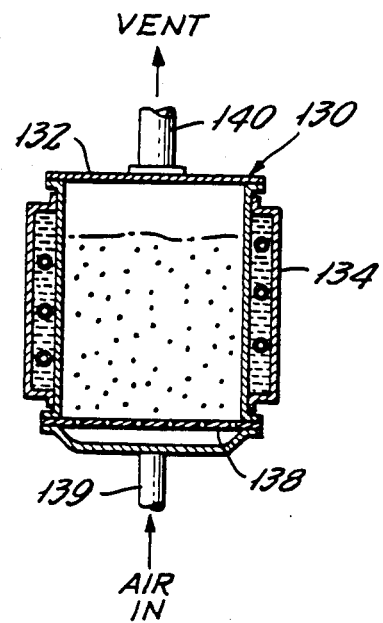
FIG. 7 is a transverse vertical sectional view taken along the line 7—7 in FIG. 6.

Fluidized particles from the fluidizing bed 110 are discharged through a conduit 128 to a cooler fluidizing bed indicated generally at 130. As best shown in FIGS. 6 and 7, the cooler bed 130 includes a rectangular metal casing 132 which is surrounded by a cooling jacket 134. The jacket 134 is supplied with water or other cooling fluid through an inlet conduit 135, and the cooling fluid is withdrawn through an outlet conduit 136. Spaced a short distance above the bottom of the casing 132 is a perforated plate 138. The space beneath the plate 138 is supplied with air or other fluidizing gas at room temperature from an inlet conduit 139 which is connected through a valve 142 (FIG. 1) to the supply conduit 120 between the blower 122 and the valve 124. The fluidizing gas is continuously discharged from the cooler bed 130 through a vent 144 which communicates with the vent 116 leading from the oxidizer bed 110.

The irregularly shaped particles introduced into the tumbler 10 comprise particles of glass or other vitreous material. In addition to soda lime glass commonly used for highway striping, glass having a higher index of refraction such as the titanium glasses, for example, may be employed with substantially equal facility. The particles may be screened, if desired, to limit the product to a particular size range, or they may be treated in accordance with the process to create glass spheres of variable sizes which may then be screened, if desired, to provide beads of a particular size range. The process also may be used to produce spheres from plastic particles or substantially any other material having the capability of becoming soft upon the application of heat. One of the advantages of the process is that it has the capability of producing larger diameter spheres than many of the processes employed commercially heretofore. In the prior vertical draft tube systems, for example, the spheres customarily range in diameter from about 1 micron to a maximum of about 1.0 millimeters, but with the process of the present invention good quality spheres are formed which have a diameter range of anywhere from about 1 micron to about 6.0 millimeters.

The irregularly shaped particles are thoroughly mixed in the tumbler 10 with an oxidizable adherent protective coating of extremely fine particle size. Although a wide variety of coating materials may be employed which meet these criteria, particularly good results are achieved with coatings of carbon black. Boron nitride, the silanes containing carbon atoms, and other carbonaceous material that is not wetted by soft or molten glass also may be employed with good effect. Among the carbon blacks useful as coating materials are those available commercially and identified as furnace black.

The quantity of coating material employed should be sufficient to provide a complete and uniform coating around each glass particle. If an excess of coating material is applied to the particles, however, the excess material does not improve the efficacy of the coating and is merely wasted. For crushed glass particles ranging in size from 18 to 40 mesh U.S. Standard, and for the carbon blacks used thus far, the amount of coating material per pound of particles preferably should range from about 0.5 grams to about 2 grams, and particularly good results are achieved in cases in which the coating is applied in the ratio of about 1.0 grams per pound of particles. Below about 0.5 grams per pound the material is insufficient to completely coat each particle, while above about 2 grams per pound a satisfactory product is achieved but the excess coating provides no further beneficial effect. For particles smaller than 18–40 mesh, a proportionately greater amount of coating material is employed because of the increased surface area of the particles. Conversely, particles above this particular range require correspondingly less coating material. The quantity of coating material used for a particular run is inversely proportional to the surface area of the particles in a substantially straight line relationship. To meet these criteria the amount of coating material on the glass particles advantageously ranges from about 0.1% to about 0.5% by weight.

The use of an adherent coating material of this character enables the realization of a smooth and uniform coating on each particle without the necessity for employing binders, matrices or other additives to the coating. Thus, resins, charcoal matrices, etc. are eliminated, with the result that the coating may be applied more rapidly than prior coating materials and at much less cost.

Upon the completion of the coating step, the crushed glass particles are introduced through the conduit 13 to the fluidizing bed 15. The rate of flow of the incoming particles is such that there is continuously maintained within the bed channels 30 and 31 (FIGS. 3 and 3a) a volume of particles that is about one-half the volume of the channels. The particles are fluidized in the channels 30 and 31 by the inert gas from the conduits 53, 54, 55, 56 and 57, and the particles are heated to an elevated temperature sufficiently high and for a time sufficient to soften the particles and allow surface tension to shape them into spherical form while in a fluidized condition.

The heating of the particles is carefully controlled as they move through the successive zones 36, 37, 38 and 45 of the fluidizing bed 15 by regulating the temperature of the inert atmosphere within the zones. This is accomplished by controlling the external heaters 67, 69 and 70 and the internal heaters 39, 40 and 41 (FIGS. 3 and 3a). For the spheoridization of soda lime silicate glass, for example, the temperature of the particles moving through the zone 36 is raised to about 400° C. At this stage in the process the particles are not yet soft, and they retain their uniform carbonaceous coating. In the zone 37 the particle temperature is again increased, and in zones 38 and 45 the temperature is further increased to approximately 850° C. or 900° C. The residence time in the two zones 38 and 45, illustratively 15 minutes, is sufficient to permit each particle to become soft and enable the surface tension of the particle to shape it into spherical form while being maintained in a fluidized condition. The atmosphere within the zones 38 and 45 is sufficiently inert to avoid any burning or oxidation of the coating on the particle. The incoming inert gas from the conduit 55 is maintained at a temperature of about 600° C. by the heater 69, and the heater 70, together with the heaters 39, 40 and 41 (FIGS. 3 and 3a) provide a further increase in the temperature of the atmosphere within the zones 38 and 45 to bring the particles to their spheoridization temperature.

The fluidized particles within the bed 15 are held at their spheoridization temperature as the particles move through the zone 38 to the outfeed zone 45. As best seen in FIG. 2, the level of the particles in the zone 45 has dropped substantially as a result of the weir plate 46, and the particles proceed over the ledge 48 on the weir plate 47 and into the vertical discharge conduit 49.

From the discharge conduit 49 the now spherical particles enter the sealer and intermediate cooler bed 105. The particles are subjected to a sharp drop in temperature within the bed 105, and they are maintained at the reduced temperature, illustratively 600° C., in a fluidized condition for a period of time sufficient to cause the setting of the spheres. In addition to cooling the particles, the bed 105 provides a seal between the inert atmosphere within the bed 15 and the oxidizing atmosphere within the bed 110.

Upon the exposure of the solidified spherical particles to the oxidizing atmosphere in the bed 110, the carbonaceous coating on the particles rapidly burns off and is discharged through the vent 116. Because of this extremely thin coating each individual particle of coating material is removed from the surface of the spherical particle with the result that the individual spheres are optically clear and require no further cleaning, washing or other treatment. The oxidizing atmosphere within the bed 110 is at a temperature in excess of the burning or oxidation temperature of the coating material but below the softening temperature of the spherical particles to avoid sticking or deformation of the spheres as they contact one another after the coating has been removed. The atmosphere within the bed 110 is maintained at this temperature by the heated air entering the bed through the heater 126 and the conduit 115 and by the heat generated by the burning of the coating material.

The optically clear glass spheres proceed through the conduit 128 to the cooler bed 130. The particles are.

maintained in a fluidized condition within the bed 130 as their temperature is further reduced to about 90° C. The resulting product is then discharged into a collector 148.

During the manufacturing process both the particles and the coating material are in a dry condition without the presence of water or other liquids. The presence of water in the tumbler 10, for example, exhibits a tendency to cause the particles to stick together and also necessitates the use of a much heavier coating on each particle. At the temperatures encountered within the fluidizing bed 15 the water may cause the formation of oxygen with the result that some of the coating material may burn off prematurely. As the particles touch one another in their fluidized condition, to avoid sticking or misshapen particles it is important that the coating remain on each particle until such time as the particles have solidified in the form of glass spheres. The coating is then removed from the spheres while they are still at an elevated temperature.

Figure 8:
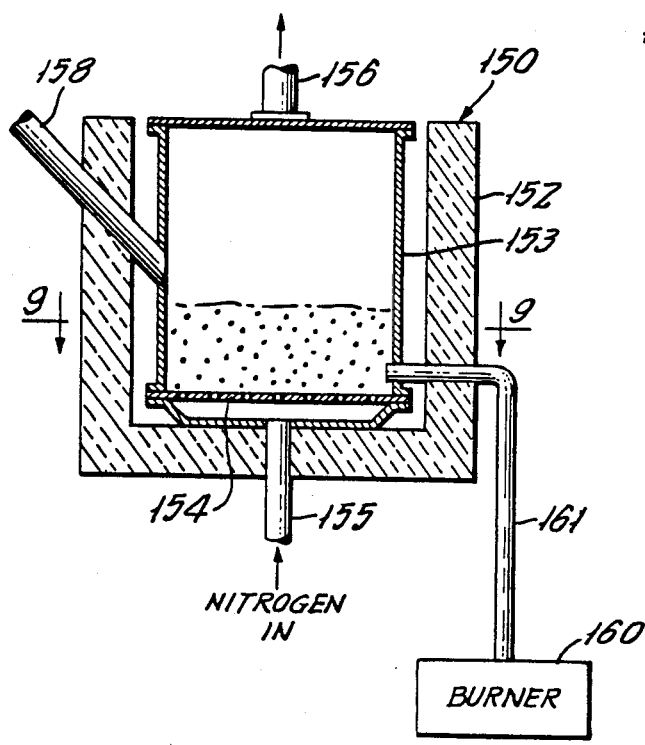
FIG. 8 is a vertical sectional view of a fluidizing bed utilized in an apparatus for producing glass beads in accordance with another illustrative embodiment of the invention.
Figure 9:
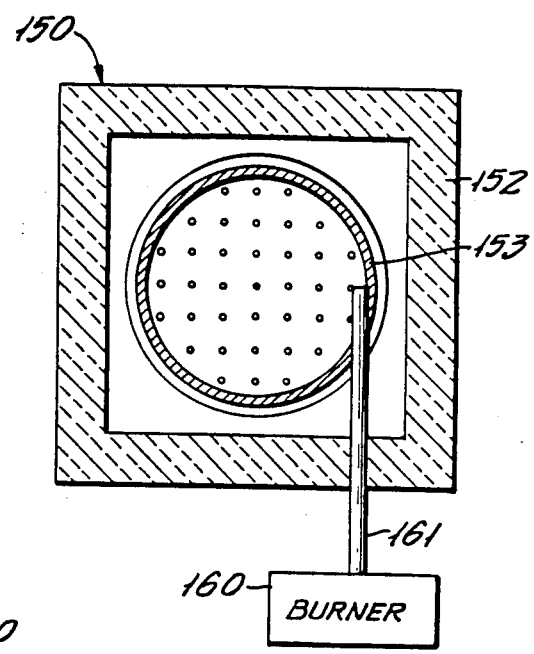
FIG. 9 is a horizontal sectional view taken along the line 9—9 in FIG. 8.

Referring now to FIGS. 8 and 9, there is shown a fluidizing bed 150 for receiving a multiplicity of crushed particles to be spheoridized in accordance with another illustrative embodiment of the invention. The bed 150 is provided with a casing 152 of refractory heat-insulating material and a cylindrical shell 153 within the casing. A perforated bottom plate 154 is located within the shell 153 in spaced relationship with the bottom wall of the casing 152. Protruding through the bottom wall is an inlet conduit 155 which is connected to the nitrogen conduit 60 (FIG. 1) or other suitable source of heated inert gas. The conduit 155 admits gas into the space between the bottom wall and the plate 154 and then through the perforations in the plate to maintain the crushed particles within the shell 153 in a fluidized condition in an inert atmosphere. The shell includes a return conduit 156 for continuously withdrawing inert gas from the shell and recycling the gas through the system in the manner described above.

A particle inlet conduit 158 extends through the cylindrical side wall of the shell 153, and a burner 160 is externally disposed adjacent the shell. The exhaust from the burner communicates with the interior of the shell 153 through a conduit 161 which is tangentially connected to the lower portion of the shell. A fuel rich flame is maintained in the burner 160 to create soot in the form of carbon black in the burner exhaust.

As the crushed glass particles are admitted through the conduit 158 into the shell 153, they become fluidized by the incoming inert gas from the conduit 155. The incoming carbon black from the burner exhaust conduit 161 follows a whirling or vortical path as it enters the shell 153 to apply a thin but complete coating to each individual glass particle within the shell. The burner flame is adjusted to introduce the carbon black in the proportions discussed above.

The coated particles within the fluidizing bed 150 are heated to an elevated temperature sufficiently high to allow surface tension to shape the particles into spherical form while the particles are in a fluidized condition within the bed. The particles are then cooled while in a fluidized condition for a period of time sufficient to cause the setting of the spheres, and the coating is removed by means of the above-described oxidization process.

Although the invention has been illustrated and described as having particular utility in the manufacture of glass spheres through the use of one or more fluidizing beds, certain features of the invention also may be employed in other types of sphere forming systems. For example, the novel coating and coating removal techniques described herein result in a more efficient process and a substantially improved product when using vertical draft tube systems, rotary kilns, so-called frying pan techniques and the manufacture of the spheres by means of a dropping or prilling tower. Because the coating prevents the deformation or sticking of the particles in these various systems and is readily removable without the need for washing the spheres, the resulting product exhibits extremely good uniformity and a much higher percentage of true spheres. Various other sphere producing or treating systems with which the invention may be employed will become apparent to those skilled in the art upon a perusal of the foregoing specification.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

What is claimed is:

1. Apparatus for making spheres from a multiplicity of minute particles, the apparatus comprising, in combination:

a first fluidizing bed having a protective atmosphere for receiving a multiplicity of the particles;

means for directing a fluidizing gas into the first fluidizing bed to suspend the particles therein and thereby fluidize the same;

heating means for raising the temperature of the particles sufficiently high to allow surface tension to shape the particles into spherical form while in a fluidized condition in said bed;

a second fluidizing bed having an atmosphere different from that of the first fluidizing bed; and means for transferring the spherical particles from said first bed to said second bed, the particles being maintained in said second bed in a fluidized condition for a period of time sufficient to cause the setting of the spheres.

2. Apparatus for making glass spheres from minute glass particles, the apparatus comprising, in combination:

means for coating a multiplicity of the glass particles with an oxidizable adherent protective material;

a first fluidizing bed for receiving the thus coated particles;

means for introducing an inert gas into the first bed to fluidize the particles therein;

heating means for raising the temperature of the particles sufficiently high to allow surface tension to shape the particles into spherical form while in a fluidized condition in said first bed;

means for cooling the spherical particles while maintaining the particles in a fluidized condition for a time sufficient to cause the setting thereof to form glass spheres;

a second fluidizing bed having an oxidizing atmosphere;

means for transferring the spherical particles from said first bed to said second bed, the particles being maintained in a fluidized condition in said second bed for a period of time sufficient to oxidize and remove the protective coating thereon.

3. Apparatus as defined in claim 2 which further comprises, in combination:

means for removing inert gas from said first fluidizing bed and for returning the removed gas to said bed to recycle the same.

4. Apparatus for making glass spheres from minute glass particles, the apparatus comprising, in combination:

tumbler means for coating a multiplicity of the glass particles with an oxidizable adherent protective material;

a first fluidizing bed for receiving the thus coated particles;

means for introducing an inert gas into the first bed to fluidize the particles therein;

heating means for raising the temperature of the particles sufficiently high to allow surface tension to shape the particles into spherical form while in a fluidized condition in said first bed;

means for cooling the spherical particles while maintaining the particles in a fluidized condition for a time sufficient to cause the setting of the spheres;

a second fluidizing bed having an oxidizing atmosphere;

means for transferring the spherical particles from said first bed to said second bed, the particles being maintained in a fluidized condition in said second bed for a period of time sufficient to oxidize and completely remove the protective coating thereon;

a third fluidizing bed; and means for transferring the spherical particles from said second bed to said third bed, the particles being maintained in a fluidized condition in said third bed for a time sufficient to further cool the same.

5. Apparatus for making glass spheres from minute glass particles, the apparatus comprising, in combination:

means for coating a multiplicity of the glass particles with an oxidizable adherent protective material;

a first fluidizing bed for receiving the thus coated particles;

combustion inhibiting means for introducing an inert gas into the first bed to fluidize the particles therein while preventing combustion of the particles during the time they are in said first bed;

heating means for raising the temperature of the particles sufficiently high to allow surface tension to shape the particles into spherical form while in a fluidized condition in said first bed;

means for cooling the spherical particles while maintaining the particles in a fluidized condition for a time sufficient to cause the setting of the spheres;

a second fluidizing bed having an oxidizing atmosphere;

means for transferring the spherical particles from said first bed to said second bed, the particles being maintained in a fluidized condition in said second bed for a period of time sufficient to oxidize and completely remove the protective coating thereon.

* * * * *